UNITED STATES PATENT OFFICE 2,458,337

METHOD OF PREPARING GAMMA-DIALKYL BUTYRONITRILES

Herman A. Bruson, Rydal, and Thomas W. Riener, Philadelphia, Pa., assignors, by mesne assignments, to Rohm & Haas Company, Philadelphia, Pa., a corporation of Delaware No Drawing. Application January 28, 1948, Serial No. 4,934

5 Claims. (Cl. 260—465.1)

The invention relates to a method for preparing gamma-dialkyl butyronitriles. It deals with a method whereby alpha-cyanoethyl-alpha,alpha-dialkyl acetaldehydes are converted to gamma-dialkyl butyronitriles.

According to this invention, alpha-cyanoethyl-alpha,alpha-dialkyl acetaldehydes of the formula

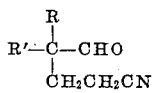

wherein R and R' are alkyl groups, are decomposed in the presence of an organic peroxide with elimination of carbon monoxide. When carbon monoxide splits out of the aldehydo group, there results compounds of the formula

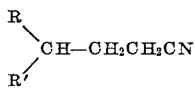

These are valuable intermediates for the preparation of branched-chained compounds. By hydrolysis by known methods they yield branched carboxylic amides, acids, and esters. By reduction they yield branched chain amines.

Typical organic peroxides which are suitable for effecting the decarbonylation are, by way of example, benzoyl peroxide, phthaloyl peroxide, naphthoyl peroxide, acetyl benzoyl peroxide, acetyl peroxide, caproyl peroxide, lauroyl peroxide, cinnamoyl peroxide, tetralin peroxide, cumene peroxide, hydrocyclohexyl hydroperoxide, di-tert.-butyl peroxide, tert.-butyl hydroperoxide, urea peroxide, acetone peroxide, tert.-butyl perbenzoate, perphthalic acid, peracetic acid, and the like.

The alpha - cyanoethyl - alpha,alpha - dialkyl acetaldehydes are readily obtainable by reacting by addition an alpha, alpha-dialkyl acetaldehyde and acrylonitrile in the presence of an alkaline catalyst. Full details of the procedure for effecting this reaction are given in our U. S. Patent No. 2,353,687, issued July 18, 1944. The dialkyl acetaldehydes

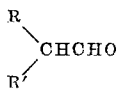

used as starting materials may have two identical alkyl groups as R and R' or two different alkyl groups. The alkyl groups may be straight or branched. Typical groups are methyl, ethyl, propyl, butyl, isobutyl, amyl, hexyl, octyl, dodecyl, and the like. It is preferred that the two groups together do not contain more than sixteen carbon atoms. It is also preferred to deal with compounds in which one of the groups does not contain more than nine carbon atoms and in which one of the alkyl groups is joined to the alpha-carbon atom of the aldehydic compound at a primary carbon atom of said alkyl group.

The newly discovered reaction of this invention is not confined to monocyano alkylated acetaldehyde. It is also obtained with some cyanoethylated aldehydes in which another kind of substituent occurs in the alpha-position, such as benzyl or hexahydrobenzyl. Similarly, in place of one of the alkyl groups, there may be a cyanoethyl group. For example, alpha,alpha-di(2-cyanoethyl) propionaldehyde, which is formed by addition of two moles of acrylonitrile to propionaldehyde, may be decarbonylated with a peroxide catalyst to yield gamma-methyl pimelonitrile. The alpha-alkyl-alpha,alpha-di(cyanoethyl) acetaldehydes thus yield gamma-alkyl pimelonitriles, from which there are obtainable branched-chain dibasic acid derivatives and amines.

Typical dialkyl acetaldehydes from which the alpha-cyanoethyl alpha,alpha dialkyl acetaldehydes are prepared are isobutyraldehyde, alpha-methyl butyraldehyde, alpha-methyl hexaldehyde, alpha-methyl octaldehyde, alpha-methyl dodecanal, alpha-ethyl butyraldehyde, alpha-ethyl hexanal, alpha-ethyl octanal, alpha-butyl butyraldehyde, alpha-butyl hexanal, alpha-butyl octanal, alpha-butyl isononanal, alpha-hexyl isononanal, alpha-heptyl isononanal, alpha-isoheptyl isononanal, etc. In each case the resulting cyanoethylated product contains the 2-cyanoethyl group in the alpha-position in respect to the aldehydo group.

The decarbonylation reaction of the alpha-(2-cyanoethyl)-alpha,alpha - dialkyl acetaldehydes takes place upon addition thereto of an organic peroxide, which functions as a catalyst for this reaction. The decarbonylation reaction occurs slowly at about 30° C. and is accelerated by heating the mixture. It is satisfactorily rapid at 100° C. to 150° C.

The peroxide may be added in an amount less than molecularly equivalent. From 1% to 20% of peroxide on the weight of the cyanoethyl dialkyl acetaldehyde usually give good results. If desired, small amounts of peroxide may be repeatedly added to the cyanoethyl dialykl acetaldehydo or aldehydo nitrile during the course of the reaction. This starting material may be extended with an inert organic solvent and decarbonylation effected with reflux of this solvent.

The following examples present typical procedures for the preparation of alpha,alpha-dialkyl butyronitriles from cyanoethyl dialkyl acetaldehydes.

Example 1

Cyanoethyl isobutyraldehyde,

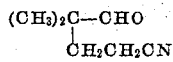

was mixed with ten per cent of its weight of di-tert.-butyl peroxide. This mixture was heated at 130° C. in a flask equipped with a reflux condenser. In about five hours the evolution of carbon monoxide ceased. The resulting reaction mixture was distilled. The fraction obtained at 155°–156° C. at 758 mm. corresponded in composition to

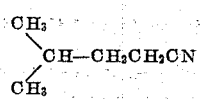

It has a refractive index, $N_D^{22}$, of 1.4048 and a density, $d_4^{20}$, of 0.8009. The yield as obtained under the above conditions was 30% of theory. This can be increased by the addition of a small amount of peroxide followed by continued heating.

Example 2

A mixture was made from 195 grams of cyanoethyl-2-ethylhexaldehyde,

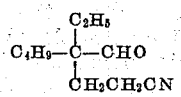

and 17.5 grams of di-tert.-butyl peroxide. This mixture was stirred and heated at 128°–132° C. in a flask equipped with a reflux condenser. At the end of six hours the reaction mixture was washed with water and subjected to distillation under reduced pressure. A fraction of 61 grams was obtained at 100°–102° C./9 mm. which corresponded in composition with

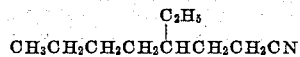

The product has an index of refraction, $N_D^{20}$, of 1.4336 and a density, $d_4^{20}$, of 0.8300. About 60 grams of unchanged aldehydo nitrile used as starting material was recovered.

Example 3

The procedure of Example 2 was followed, but cyanoethyl-2-ethyl butyraldehyde was used as the starting material and 10% of its weight of hydroxyclyclohexyl hydroperoxide was added. From the reaction mixture there was separated by fractional distillation a liquid in a yield of 40% boiling at 74°–76° C./9 mm., having a refractive index, $N_D^{20}$, of 1.4258 and a density, $d_4^{20}$, of 0.8419. Its analysis identified it as the compound.

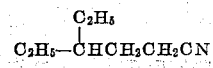

In the same way other alpha-cyanoethyl-alpha, alpha-dialkyl acetaldehydes are decarbonylated when heated in the presence of a small amount of an organic peroxide as catalyst to yield gamma-dialkyl butyronitriles.

We claim:

1. A method for preparing gamma-dialkyl butyronitriles of the formula

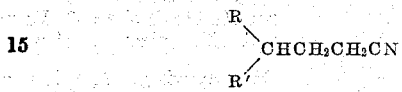

wherein R and R' are alkyl groups, which comprises treating an aldehydo nitrile of the formula

with an organic peroxide as a catalyst and decarbonylating said aldehydo nitrile.

2. A method for preparing gamma-dialkyl butyronitriles of the formula

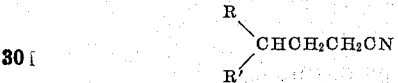

wherein R and R' are alkyl groups of not over nine carbon atoms each, the sum of the carbon atoms in R and R' being not over sixteen, which comprises treating between 30° C. and 150° C. with an organic peroxide as catalyst an aldehydo nitrile of the formula

whereby there are formed carbon monoxide and a gamma-dialkyl butyronitrile.

3. A method for preparing gamma-diethyl butyronitrile which comprises treating between 30° C. and 150° C. with an organic peroxide as catalyst the compound alpha-cyanoethyl-alpha-ethyl butyraldehyde and decarbonylating said compound.

4. A method of preparing gamma-ethyl-gamma-butyl butyronitrile which comprises treating between 30° C. and 150° C. with an organic peroxide as catalyst the compound alpha-cyanoethyl-alpha-ethyl hexaldehyde and decarbonylating said compound.

5. A method of preparing gamma-diamethyl butyronitrile which comprises treating between 30° C. and 150° C. with an organic peroxide as catalyst the compound alpha-cyanoethyl isobutyraldehyde and decarbonylating said compound.

HERMAN A. BRUSON,
THOMAS W. RIENER.

No references cited